UNITED STATES PATENT OFFICE.

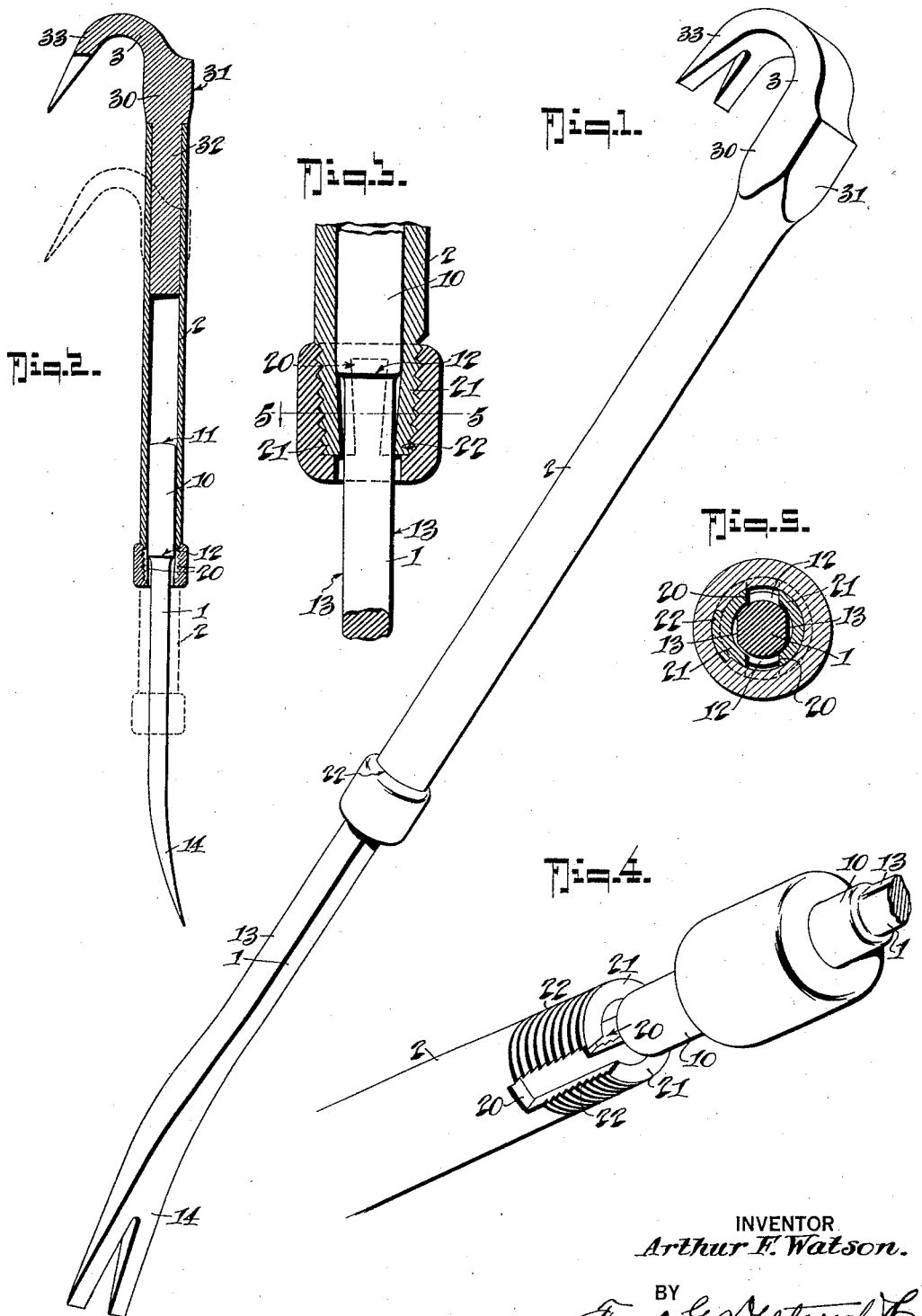

ARTHUR F. WATSON, OF CHEBOYGAN, MICHIGAN.

PINCH-BAR.

1,401,214.   Specification of Letters Patent.   Patented Dec. 27, 1921.

Application filed November 8, 1920. Serial No. 422,597.

*To all whom it may concern:*

Be it known that I, ARTHUR F. WATSON, a citizen of the United States, residing at Cheboygan, and county of Cheboygan, and State of Michigan, have invented a new and useful Pinch-Bar, of which the following is a specification.

My invention has for its purpose to provide a new and improved tool or device, which, while especially designed for use as a pinch bar, may be readily adapted for other uses, for example as a nail puller, hammer, etc., the several parts being so arranged and combined whereby the implement may be conveniently and effectively manipulated for its intended purposes and adapted for being manufactured at small cost.

Another object of my invention is to provide a tool or device, of the character stated, primarily designed for use as a pinch bar and in which the lever elements of the bar have adjustable connection, with one element arranged for effecting a hammering or impact force on the other, and the pinch member or element and the other parts adapted for being readily assembled and held from disconnection during use.

With other minor objects in view that will hereinafter appear, my invention consists of a new tool or device that embodies the peculiar arrangement and combination of elements, fully set out in the detailed description, as specifically mentioned in the appended claims and illustrated in the accompanying drawings in which:

Figure 1 is a perspective view of my improved device.

Fig. 2 is a longitudinal section thereof, the tubular or movable lever member being shown at the extended position, in full lines, and at its innermost or hammering position, in dotted lines.

Fig. 3 is an enlarged detail section of the threaded end of the tubular lever member or handle, the pinch member and the screw connecting cap, the latter being shown as screwed up to draw the slotted portions of the handle together to form stops preventing the ready separation of the pinch and handle members.

Fig. 4 is a detail perspective view of the threaded or slotted open end of the tubular handle with the slotted ends thereof shown at their original or extended position, the outer end of the pinch member, and the screw cap, the latter being shown as loosely fitted onto the non-circular end of the pinch member and Fig. 5 is a detail cross section taken on the line 5—5 on Fig. 3 and looking in the direction of the arrow.

In the practical development of my invention, the tool or device is composed of a relatively rigidly held, member which is hereinafter termed the pinch lever member, a tubular or pipe section, into which, one end, hereinafter termed the upper end, of the pinch member is slidably held in the manner presently explained.

The pinch member, which is shaped from a steel bar whose upper end 10 is round and slightly beveled at its extremity as indicated at 11, is flattened at opposite sides, whereby to form shoulders 12—12, located about midway its length, the purpose of which will presently appear, and the lower end of the said pinch member is flattened laterally, with respect to the flattened sides 13—13, into an upturned prying head 14 that tapers to a relatively sharp edge, whereby to provide for using it as a pinch lever, the said head being formed with a transversely tapered slot to adapt it for use as a nail puller.

The handle end of the device, is in the nature of a tubular member, which may be a piece of gas pipe of suitable size, and one end (the lower) of the said pipe is longitudinally slotted, preferably at diametrically opposite sides, as indicated at 20—20, to provide flexible fingers 21—21 between the said slots, and the said lower end of the tubular member is externally threaded, as at 22, the threads extending to the outer extremity of the fingers 21 as shown.

3 designates a hand hold on a solid metal block 30, having one face shouldered and flattened to form a hammer head 31, and one end of the said block 30 terminates in the shank 32 for fitting into the upper end of the tubular member 2, to which end the block 30 and shank 32 in the formation of the completed article, are welded to make the parts 3 and 2 integral, and the said body or block 30 is also formed into a gradually tapering extension 33 that is bent up to constitute the hand hold 3 that provides for conveniently grasping the upper end of the complete pinch bar, when the parts are operatively assembled.

The extension 33 is also gradually tapered and is provided with a tapering slot whereby to adapt the said end for pulling nails or spikes.

In practice the shank 32 of the block 30 constitutes a driver or impacting head for forcing the pinch member under the object to be lifted as is usual in telescopic pinch bars, and the shouldered portions 12 on the said member constitute stops for engaging the inwardly bent tongues 21 on the lower end of the tubular member 2 when pulling the said tubular member outwardly to withdraw the pinch member from the operative or set position.

By referring more particularly to Figs. 3 and 5 it will be noticed that by forming the lever end of the tubular or pipe member 2 with slots 20 and intervening or tongue like portions 21—21, and rounding the upper end of the bar 1 when assembling the parts (the screw cap being first slid onto the bar 1) the bar 1 has its inner end forced inwardly between the tongues 21 and with shouldered portions in line with the slots 20 in the tubular member 2 after which the cap, whose internally threaded socket is slightly tapering as shown in Fig. 3, is screwed onto the threaded end of the member 2, it being understood that when the cap is being screwed home, the two tongues 21 are caused to bend slightly inward and thereby form the stop members for engaging the members 12 formed on the member 3, thereby preventing displacement of the said bar 3 during ordinary use, it being understood that since the member 1 may be inserted some distance into the bar member 2, the device may be compactly folded. My invention is simple, can be easily and cheaply made and its various uses and advantages will be readily understood by those familiar with implements of this kind.

What I claim is:

1. An appliance of the character stated, comprising a bar composed of telescopic sections, the upper or tubular member having an integral hand hold at the upper end, the other member having its lower end formed into a pinch or lever portion and its upper end shaped for slidably receiving thereon the tubular lever members against pulling apart, the lower end of the tubular member terminating in externally threaded flexible extensions, the corresponding upper end of the other member having oppositely flattened portions whereby to form shoulders, and an internally threaded coupling cap that slidably engages the shouldered end members and the threaded flexible extensions whereby to crowd the said extension against the opposite flattened faces of the opposing solid member when the coupling cap is screwed home.

2. An appliance of the character stated, comprising a bar composed of telescopic sections, the upper or tubular member having an integral hand hold at the upper end, the other member having its lower end formed into a pinch or lever portion and its upper end shaped for slidably receiving thereon the tubular lever members against pulling apart, the lower end of the tubular member terminating in externally threaded flexible extensions, the corresponding upper end of the other member having oppositely flattened portions whereby to form shoulders, and an internally threaded coupling cap that slidably engages the shouldered end members and the threaded flexible extensions whereby to crowd the said extension against the opposite flattened faces of the opposing solid member when the coupling cap is screwed home, the internally threaded face of the coupling being tapering, whereby to bend the said flexible extensions of the tubular member inwardly against the flattened faces of the opposing solid members thereby providing stops for holding the said solid member from accidental separation from the tubular member.

ARTHUR F. WATSON.